United States Patent
Kim et al.

(10) Patent No.: US 11,856,676 B2
(45) Date of Patent: Dec. 26, 2023

(54) INDUCTION HEATING TYPE COOKTOP HAVING IMPROVED USABILITY

(71) Applicant: LG Electronics Inc., Seoul (KR)

(72) Inventors: Juwon Kim, Seoul (KR); Eunjin Jang, Seoul (KR); Jongwon Hwang, Seoul (KR); Yongsoo Lee, Seoul (KR); Hyunwoo Jun, Seoul (KR); Jaekyung Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 150 days.

(21) Appl. No.: 17/179,925

(22) Filed: Feb. 19, 2021

(65) Prior Publication Data

US 2021/0259062 A1 Aug. 19, 2021

(30) Foreign Application Priority Data

Feb. 19, 2020 (KR) .......................... 10-2020-0020695

(51) Int. Cl.
*H05B 6/06* (2006.01)
*H05B 6/12* (2006.01)
*H05B 6/04* (2006.01)

(52) U.S. Cl.
CPC .............. *H05B 6/062* (2013.01); *H05B 6/04* (2013.01); *H05B 6/1263* (2013.01); *H05B 2206/022* (2013.01)

(58) Field of Classification Search
CPC .. H05B 6/1263; H05B 6/1209; H05B 6/1245; H05B 6/062; H05B 6/04; H05B 2206/022; Y02B 40/00
See application file for complete search history.

(56) References Cited

U.S. PATENT DOCUMENTS

| | | | |
|---|---|---|---|
| 6,770,857 B2 | 8/2004 | Hirota et al. | |
| 2005/0205561 A1* | 9/2005 | Keishima | H05B 6/1209 219/621 |
| 2011/0073588 A1* | 3/2011 | Kusaka | H05B 6/062 219/621 |
| 2014/0287100 A1* | 9/2014 | Libman | H05B 6/6447 426/87 |

(Continued)

FOREIGN PATENT DOCUMENTS

| DE | 10127051 | 12/2002 |
|---|---|---|
| EP | 3512302 | 7/2019 |

(Continued)

OTHER PUBLICATIONS

Extended European Search Report in European Appln. No. 21157882.8, dated Jul. 1, 2021, 7 pages.

*Primary Examiner* — Dana Ross
*Assistant Examiner* — Kuangyue Chen
(74) *Attorney, Agent, or Firm* — Fish & Richardson P.C.

(57) ABSTRACT

An induction heating type cooktop includes: a case, a cover plate that is coupled to an upper end of the case and that includes an upper plate arranged to receive a target object, a working coil that is disposed in the case and that is configured to heat the target object, a thermal insulation material disposed on the working coil, and a heating thin film coating that is disposed on a surface of the upper plate of the cover plate or a surface of the thermal insulation material and that has a stacked structure in which an adhesive layer and a heating layer are consecutively stacked.

21 Claims, 7 Drawing Sheets

(56) References Cited

U.S. PATENT DOCUMENTS

| | | | |
|---|---|---|---|
| 2016/0050721 A1 | 2/2016 | Corda | |
| 2019/0145572 A1* | 5/2019 | Deka | F16L 59/04 |
| | | | 156/286 |
| 2020/0396805 A1* | 12/2020 | Matsen | A47J 36/02 |

FOREIGN PATENT DOCUMENTS

| | | |
|---|---|---|
| JP | 2008311058 | 12/2008 |
| JP | 5630495 | 10/2014 |

* cited by examiner

INDUCTION HEATING TYPE COOKTOP HAVING IMPROVED USABILITY

CROSS-REFERENCE TO RELATED APPLICATION

This application claims priority to and the benefit of Korean Patent Application No. 10-2020-0020695, filed in Korea on, 19 Feb. 2020, the disclosure of which is incorporated herein by reference in its entirety.

TECHNICAL FIELD

The present disclosure relates to an induction heating type cooktop having improved usability.

BACKGROUND

Various types of cooking apparatuses are used to heat food at homes or restaurants. Among the cooking apparatuses, a gas stove can use gas as fuel to heat the food. In recent years, cooking apparatuses, capable of using electricity to heat an object to be heated, such as a cooking vessel including a pot, have been widely used instead of the gas stoves.

Methods for heating an object to be heated using electricity can be classified as a resistance heating method and an induction heating method. In the resistance heating method, an object to be heated is heated by heat that is generated when electric current flows through (i) a metallic resistance wire or (ii) a non-metallic heat generating element such as silicon carbide, and the generated heat is delivered to the object to be heated (e.g., a cooking vessel) through radiation or conduction. In the induction heating method, an object to be heated can be heated by eddy current that is generated in the object including metallic ingredients, by using a magnetic field that is generated around a coil when a predetermined magnitude of high-frequency power is supplied to the coil.

In recent years, the induction heating method has been applied to most cooktops.

A cooktop to which the induction heating method is applied can only heat a magnetic object. For example, when a non-magnetic object (e.g., thermal resistant glass, earthenware and the like) is placed on the cooktop, the cooktop cannot heat the object to be heated.

Accordingly, the following methods and cooktops have been developed to overcome limitations of an induction heating type cooktop of the related art.

First, a method of adding a heating plate, which can be heated based on induction heating, between a cooktop and a non-magnetic object has been devised in order to heat the non-magnetic object. However, for the cooktop with additional heating plate, efficient heating cannot be ensured and required time to boil water can be longer than usual. Additionally, a cooking vessel including a magnetic material is heated in an electro inductive manner using magnetic lines of force that passes through the communication hole while the heating plate is heated in an electro inductive manner using a heating coil. Thus, efficient heating cannot be ensured.

Second, a conventional cooktop can include a hybrid cooktop that heats a non-magnetic object through a radiant heater to which an electric resistance method is applied and that heats a magnetic object through a working coil to which an induction heating method is applied. However, for the hybrid cooktop, a high output from the radiant heater and efficient heating cannot be ensured. Additionally, when placing an object to be heated in a heating area, a user needs to consider a material of the object to be heated.

Finally, a conventional cooktop can include an all metal cooktop that heats all metallic objects to be heated (i.e., a non-magnetic metallic object and a magnetic metallic object). However, for the all metal cooktop, a non-magnetic non-metallic object to be heated cannot be heated. When a non-magnetic metallic object to be heated is heated, the all metal cooktop is less efficient in heating and incurs more material costs than a radiant heater.

SUMMARY

The present disclosure is directed to an induction heating type cooktop that can heat a target object regardless of a type of the target object and that can ensure improved heating efficiency.

The present disclosure is also directed to an induction heating type cooktop that can heat both the magnetic object and non-magnetic object without causing a user to consider a material of the target object.

The present disclosure is also directed to an induction heating type cooktop that can heat a target object directly and indirectly using the same heat source.

The present disclosure is also directed to an induction heating type cooktop in which (i) when a target object has a magnetic property, most of the eddy current can be supplied to the target object and a working coil can directly heat the target object and (ii) when a target object has a non-magnetic property, the working coil can indirectly heat the object to be heated.

The present disclosure is also directed to a heating coating that can be used at a wide range of temperatures and that can ensure excellent and semi-permanent durability.

The present disclosure is also directed to an induction heating type cooktop in which a component allowing of induction heating can be manufactured in a simple manner and processing costs can be reduced.

According to one aspect of the subject matter described in this application, an induction heating type cooktop includes a case, a cover plate that is coupled to an upper end of the case and that includes an upper plate arranged to receive a target object, a working coil that is disposed in the case and that is configured to heat the target object, a thermal insulation material disposed on the working coil, and a heating thin film coating that is disposed on a surface of the upper plate of the cover plate or a surface of the thermal insulation material and that has a stacked structure in which an adhesive layer and a heating layer are consecutively stacked.

Implementations according to this aspect can include one or more of the following features. For example, the heating thin film coating can further include a protection layer stacked on a surface of the heating layer.

In some examples, the heating thin film coating can be provided by a deposition technique including at least one of sputtering deposition, chemical vapor deposition (CVD), or electron beam deposition. In some examples, the heating thin film coating can be deposited in a chamber having a temperature between 20 to 100° C., the adhesive layer can be deposited at a deposition speed of 1 to 5 angstrom per second (Å/s), the heating layer can be deposited at a deposition speed of 5 to 15 Å/s, and the protection layer can be deposited at a deposition speed of 1 to 5 Å/s.

In some examples, the heating thin film coating can be provided by thermal processing at 100 to 900° C. for 1 to 5 hours after the deposition. In some implementations, the heating layer can comprise a plurality of layers.

In some implementations, the adhesive layer can comprise at least one of metal or a metal oxide. In some implementations, the heating layer can comprise at least one of metal or a metal alloy.

In some examples, the protection layer can comprise at least one of an inorganic material or a metal oxide. In some implementations, the adhesive layer can have a thickness between 10 nm to 3000 nm.

In some implementations, the heating layer can have a thickness between 0.1 μm to 50 μm. In some examples, the protection layer can have a thickness between 0.1 μm to 20 μm.

In some implementations, a skin depth of the heating thin film coating can be greater than a thickness of the heating thin film coating. In some examples, the heating thin film coating can have a resistance value that enables the heating thin film coating to be heated by the working coil. In some implementations, a diameter of the heating thin film coating can be shorter than a diameter of the upper plate of the cover plate.

In some implementations, based on the target object being magnetic, resistance and inductance of the target object can provide an equivalent circuit with resistance and inductance of the heating thin film coating. In some examples, impedance of the target object can be less than impedance of the heating thin film coating in the equivalent circuit. In some examples, magnitude of eddy current supplied to the target object can be greater than magnitude of eddy current supplied to the heating thin film coating.

In some implementations, based on the target object being non-magnetic, impedance can be present in the heating thin film coating and impedance does not present in the target object. In some examples, eddy current can be supplied to the heating thin film coating, and eddy current is not supplied to the target object.

In some implementations, based on the target object being magnetic, the target object can be directly heated by the working coil, and based on the target object being non-magnetic, the target object can be heated by the heating thin film coating that is heated by the working coil.

In some implementations, the induction heating type cooktop can further include a blocking plate that is disposed at a lower surface of the working coil and that is configured to block a magnetic field generated downward by the working coil, a support member that is disposed between a lower surface of the blocking plate and a lower surface of the case and that supports the blocking plate, and a cooling fan that is disposed in the case and that is configured to cool the working coil.

In some examples, the support member can comprise an elastic object for supporting the blocking plate upward. In some examples, the cooling fan can be configured to (i) suction air from outside of the case and deliver the suctioned air to the working coil or (ii) suction air in the case and discharge the suctioned air to outside of the case, and the thermal insulation material can limit delivery of heat to the working coil.

The induction heating type cooktop can heat all the magnetic and non-magnetic objects. Additionally, the induction heating type cooktop can heat a target object regardless of a position and type of the target object. Thus, a user may place and heat a target object in any heating area on the upper plate without checking whether the target object has a magnetic or non-magnetic property.

Additionally, the induction heating type cooktop can use the same heat source to heat a target object directly and indirectly. Accordingly, the induction heating type cooktop does not require any additional heating plate or radiant heater. Thus, the induction heating type cooktop can improve heating efficiency and reduce material costs.

DETAILED DESCRIPTION

Figure 1:
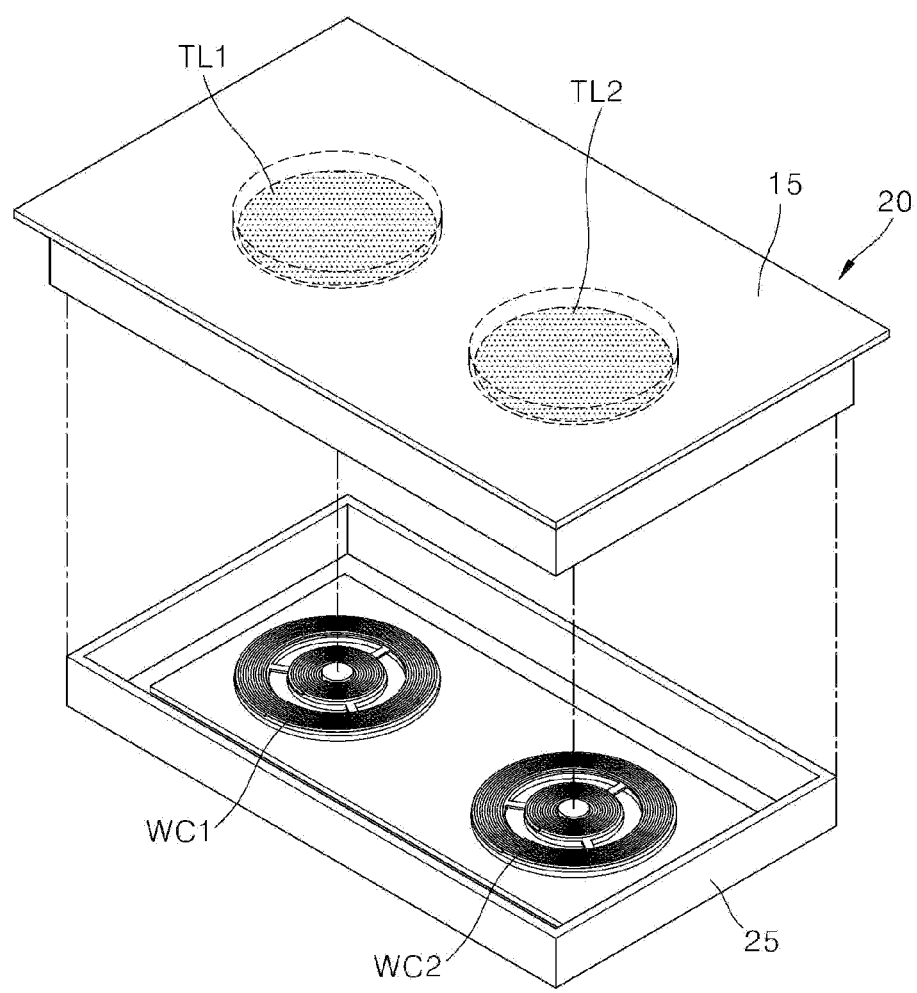
FIG. 1 is a diagram illustrating an exemplary induction heating type cooktop.
Figure 2:
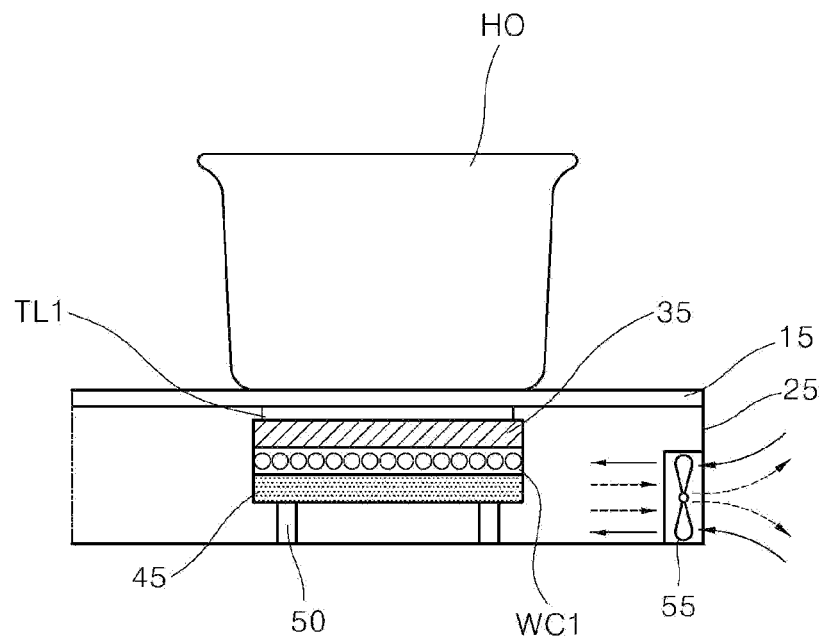
FIG. 2 is a diagram illustrating components included in the induction heating type cooktop in FIG. 1.
Figure 3:
FIGS. 3 and 4 are diagrams illustrating examples of a heating thin film coating.
Figure 4:
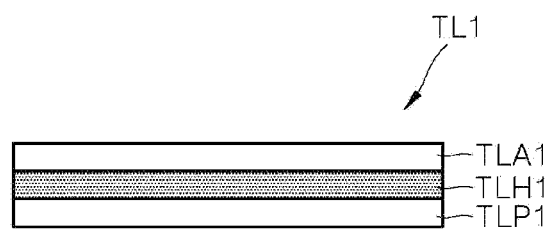
Figure 5:
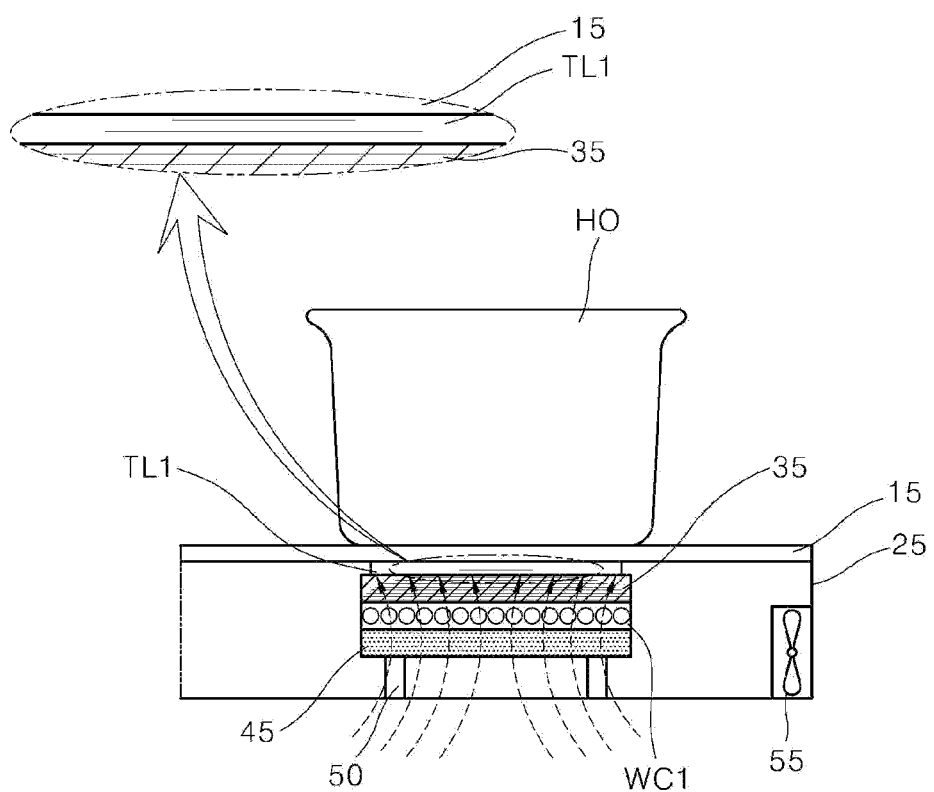
FIGS. 5 and 6 are diagrams illustrating views for describing a relationship between a thickness and a skin depth of a heating module.
Figure 6:
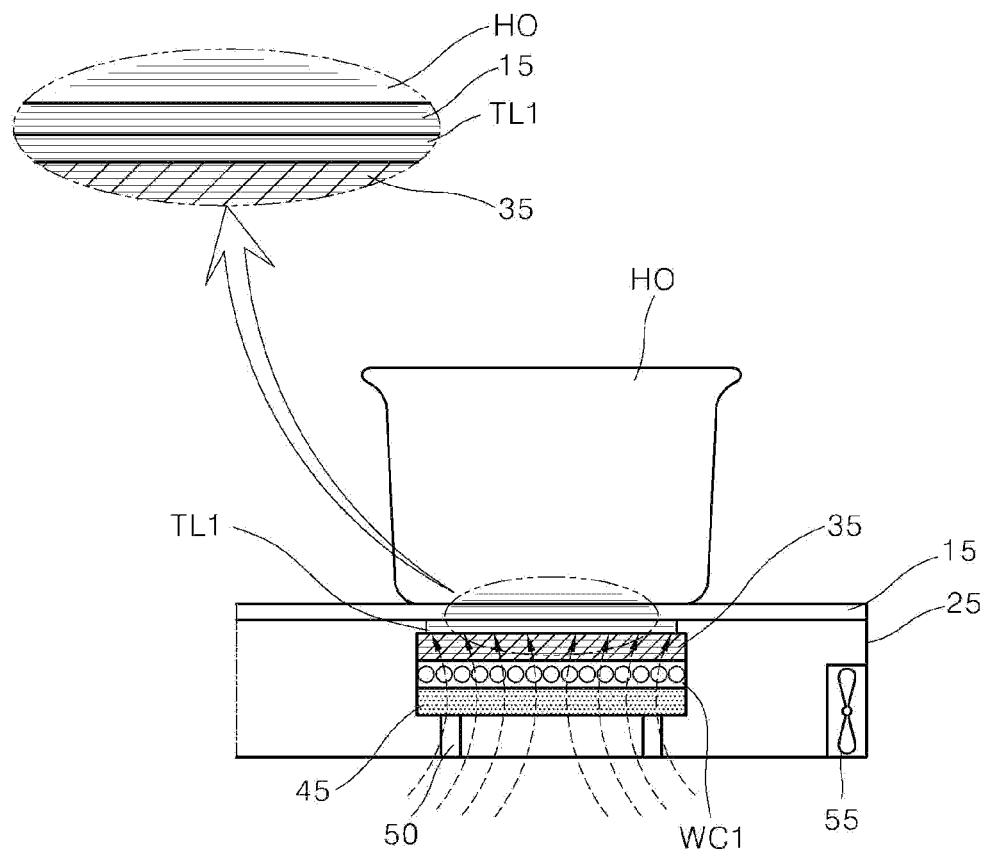
Figure 7:
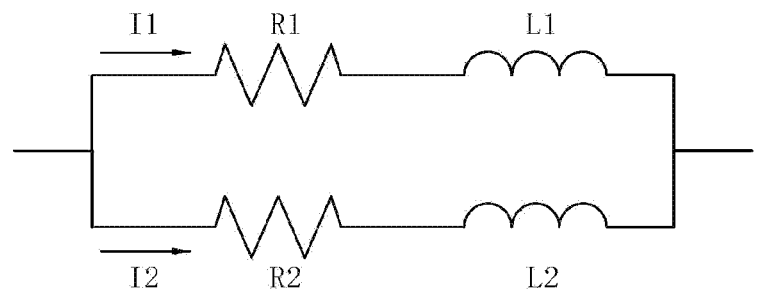
FIGS. 7 and 8 are diagrams illustrating views for describing a change in impedance between a heating thin film coating and a target object based on the type of the target object.
Figure 8:
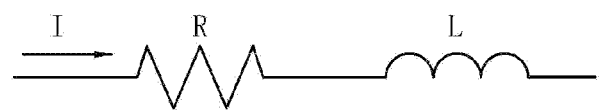

FIG. 1 is a diagram illustrating an exemplary induction heating type cooktop 1. FIG. 2 is a diagram illustrating components included in the induction heating type cooktop 1 in FIG. 1. FIGS. 3 and 4 are diagrams illustrating examples of a heating thin film coating. FIGS. 5 and 6 are diagrams illustrating views for describing features of a skin depth based on relative permeability of a thin film. FIGS. 7 and 8 are diagrams illustrating views for describing a change in impedance between a thin film and a target object based on a type of the target object.

Referring to FIG. 1, an induction heating type cooktop 1 can include a case 25, a cover plate 20, working coils WC1 and WC2 (i.e., first and second working coils), and heating thin film coatings TL1 and TL2 (i.e., first and second heating thin film coatings).

The working coils WC1 and WC2 may be installed in the case 25.

In the case 25, various types of devices related to driving the working coils WC1 and WC2, in addition to the working coils WC1 and WC2, can be installed. The devices, for example, can include a power supply configured to supply AC power, a rectifier configured to rectify AC power of the power supply into DC power, an inverter configured to convert DC power, rectified by the rectifier, into resonance current as a result of a switching operation and supply the resonance current to the working coils, a control module— the control module can include a control module for an inverter configured to control a switching operation of an inverter and a control module for an input interface configured to control an input interface—configured to control operations of various devices in the induction heating type cooktop 1, a relay or a semiconductor switch configured to turn on or turn off the working coils, and the like.

The cover plate 20 can be coupled to an upper end of the case 25, and can be provided with an upper plate 15 that allows a target object to be placed on an upper surface thereof.

For example, the cover plate 20 can include the upper plate 15 for placing a target object such as a cooking vessel.

The upper plate 15, for example, can be made of a glass material (e.g., ceramics glass).

The upper plate 15 can be provided with an input interface configured to receive an input from a user and deliver the input to the control module. In some implementations, the input interface can be disposed at another position in the induction heating type cooktop 1.

The input interface can be a module for inputting heating intensity or a time period of driving of the induction heating type cooktop 1 and similar features desired by the user, and can be implemented in various different forms such as a physical button or a touch panel and the like. In addition or alternatively, the input interface can be provided with a power button, a lock button, a power level adjustment button (+, −), a timer adjustment button (+, −), a charge mode button and the like. Further, the input interface can deliver an input, received from the user, to the control module for an input interface, and the control module for an input interface can deliver the input to the control module for an inverter. The control module for an inverter can control an operation of various devices (e.g., a working coil) based on the input (i.e., the user's input) received from the control module for an input interface.

The upper plate 15 can visually display whether the working coil (e.g., the first working coil and the second working coil WC1 and WC2) is driving, and heating intensity (i.e., thermal power) of the working coil, in a burner shape. The burner shape can be displayed by an indicator including a plurality of light emitting elements (e.g., LEDs) in the case 25.

The first and second working coils WC1 and WC2 can be installed in the case 25 to heat a target object.

For example, driving of the first and second working coils WC1 and WC2 can be controlled by the control module for an inverter, and when a target object is placed on the upper plate 15, the first and second working coils WC1 and WC2 can be driven by the control module for an inverter.

In some implementations, the first and second working coils WC1 and WC2 can directly heat a target object (i.e., a magnetic object) having a magnetic property, and first and second heating thin film coatings TL1 and TL2 can indirectly heat a target object (i.e., a non-magnetic object) having no magnetic property.

In some implementations, the first and second working coils WC1 and WC2 can inductively heat a target object, and can be respectively disposed to overlap the first and second heating thin film coatings TL1 and TL2 in a vertical direction (i.e., a perpendicular direction or an up-down direction).

In FIG. 1, two working coils WC1 and WC2 are installed in the case 25, however, in some implementations, one or three or more working coils can be installed in the case 25. The first and second working coils WC1 and WC2 installed in the case 25 will be described as an example for convenience of description.

The heating thin film coatings can include first and second heating thin film coatings TL1 and TL2. The heating thin film coating can be provided on any one surface of the upper plate or any one surface of the thermal insulation material. For example, the heating thin film coating can be provided on an upper surface or a lower surface of the upper plate, or an upper surface or a lower surface of the thermal insulation material.

In some implementations, the first and second heating thin film coatings TL1 and TL2 can be disposed on the lower surface of the upper plate 15 and spaced apart from each other.

The first and second heating thin film coatings TL1 and TL2 can be respectively disposed to overlap the first and second working coils WC1, WC2 in the vertical direction (i.e., the perpendicular direction or the up-down direction).

In some implementations, the first and second heating thin film coatings TL1 and TL2 can have at least one of a magnetic property or a non-magnetic property (i.e., a magnetic property, a non-magnetic property or both of the magnetic and non-magnetic properties).

The heating thin film coating TL1 can have a stacked structure in which an adhesive layer TLA1 and a heating layer TLH1 are consecutively stacked, as illustrated in FIG. 3.

The adhesive layer TLA1 can be a component for attaching the upper plate or the thermal insulation material to the heating layer TLH1. Further, the adhesive layer TLA1 can protect the heating layer TLH1 from ion extraction of the upper plate caused by application of a high temperature for a long period of time and limit deterioration of the performance of the heating layer TLH1.

The adhesive layer TLA1 can include at least one of metal or a metal oxide to implement the above function. For example, the adhesive layer TLA1 can include a transition metal such as titanium (Ti), chromium (Cr), iron (Fe), nickel (Ni), copper (Cu) and the like, or a metal oxide such as aluminum oxide ($Al_2O_3$), silicon dioxide ($SiO_2$), and the like.

A thickness of the adhesive layer TLA1 is not limited, but, in some implementations, the thickness can be 10 nm to 300 nm. When the adhesive layer TLA1 has a thickness of less than 10 nm, adhesion of the heating layer and the upper plate and the like may be reduced, and the performance of protecting the heating layer may not be sufficiently ensured. When the adhesive layer TLA1 has a thickness of greater than 100 nm, the induction heating performance of the heating thin film coating TLA1 may deteriorate.

The heating layer TLH1 can be a component allowing the cooktop to optionally heat a target object.

The heating layer TLH1 can include at least one of metal or a metal alloy to implement the above function. For example, the heating layer TLH1 can include at least one of tin (Sn), cobalt (Co), chromium (Cr), iron (Fe), nickel (Ni), aluminum (Al), copper (Cu), silver (Ag), or gold (Au).

A thickness of the heating layer TLH1 is not limited, but, in some implementations, the thickness of the heating layer TLH1 can be 0.1 μm to 50 μm. When the heating layer TLH1 has a thickness of less than 0.1 μm, the function of optional heating may deteriorate. When the heating layer TLH1 has a thickness of greater than 50 μm, the heating performance itself may deteriorate.

In some implementations, the heating layer THL1 can be formed into a plurality of layers.

Referring to FIG. 4, the heating thin film coating TL1 can further include a protection layer TLP1. The heating thin film coating TL1 can be provided on any one surface of the upper plate or the thermal insulation material, as described above. When the heating thin film coating TL1 is provided on the lower surface of the thermal insulation material (between the thermal insulation material and the working coil), the heating thin film coating TLA1 can further include the protection layer TLP1 to protect the heating layer from the working coil, for example. Accordingly, the protection layer TLP1 can be formed on one surface (a surface opposite to the surface on which the adhesive layer TLA1 is formed) of the heating layer TLH1.

The protection layer TLP1 can include at least one of an inorganic material or a metal oxide to protect the heating layer TLH1. For example, the protection layer TLP1 can include at least one of silicon dioxide ($SiO_2$), aluminum oxide ($Al_2O_3$), cerium oxide (CeO), or magnesium oxide (MgO).

A thickness of the protection layer TLP1 is not limited, but, in some implementations, the thickness of the protection layer TLP1 can be 0.1 µm to 20 µm. When the protection layer TLP1 has a thickness of less than 0.1 µm, the performance of protecting the heating layer may not be sufficiently ensured. When the protection layer TLP1 has a thickness of greater than 20 µm, the induction heating function of the heating thin film coating TLA1 may deteriorate.

The heating thin film coating TL1 can be formed as a result of deposition. The method for deposition is not limited. For example, one of the methods of sputtering deposition, chemical vapor deposition (CVD), and electron beam deposition can be used as the deposition method.

When the heating thin film coating TL1 is formed as a result of deposition, the thin film that has uniform density entirely can be obtained. Accordingly, the heating thin film coating TL1 formed by using the deposition method can ensure more excellent basic performance such as heating performance and the like than a thin film formed by using another method.

In some implementations, the heating thin film coating TL1 can be deposited in a chamber of 20 to 100° C., preferably, 20 to 40° C. The adhesive layer TLA1 can be deposited at a deposition speed of 1 to 5 angstrom per second (Å/s), the heating layer TLH1 can be deposited at a deposition speed of 5 to 15 Å/s, and the protection layer TLP1 can be deposited at a deposition speed of 1 to 5 Å/s. Deposition speeds of the above components can be determined as optimal deposition speeds considering the functions and materials of each of the above components. When the deposition speed is too fast, it is highly likely that a pin hole is formed in the thin film and uniformity of the thin film is reduced. When the deposition speed is too slow, productivity is reduced.

In some implementations, the heating thin film coating TL1 can be thermally processed at 100 to 900° C. for 1 to 5 hours after deposition.

A material for deposition of each component constituting the heating thin film coating TL1 is described above.

The first and second heating thin film coatings TL1 and TL2 can have a thickness to such an extent that the first and second heating thin film coatings TL1 and TL2 are inductively heated by the working coils. Description in relation to this is provided below.

A diameter (i.e., a size) of each of the first and second heating thin film coatings TL1 and TL2 can be less than a diameter of the upper plate 15.

Referring to FIG. 2, the induction heating type cooktop 1 can further include a thermal insulation material 35, a blocking plate 45, a support member 50, and a cooling fan 55.

Since components around the first working coil WC1 are the same as those around the second working coil (WC2 in FIG. 1), the components (the first heating thin film coating TL1, the thermal insulation material 35, the blocking plate 45, the support member 50 and the cooling fan 55) around the first working coil WC1 will be described below for convenience of description.

The thermal insulation material 35 can be disposed between the first heating thin film coating TL1 and the first working coil WC1.

The thermal insulation material 35 can block delivery of heat, which is generated while the first heating thin film coating TL1 or a target object HO is heated as a result of the driving of the first working coil WC1, to the first working coil WC1.

For example, when the first heating thin film coating TL1 or a target object HO is heated based on electromagnetic induction of the first working coil WC1, heat of the first heating thin film coating TL1 or the target object HO can be delivered to the upper plate 15, and heat of the upper plate 15 can be delivered to the first working coil WC1. Accordingly, the first working coil WC1 may be damaged.

The thermal insulation material 35, as described above, can block delivery of heat to the first working coil WC1, limit damage done to the first working coil WC1 by heat, and limit deterioration of the heating performance of the first working coil WC1.

In some implementations, a spacer can be installed between the first working coil WC1 and the thermal insulation material 35.

The spacer can be inserted between the first working coil WC1 and the thermal insulation material 35 such that the first working coil WC1 and the thermal insulation material 35 do not directly contact each other. Accordingly, the spacer can block delivery of heat, which is generated while the first heating thin film coating TL1 or a target object HO is heated as a result of the driving of the first working coil WC1, to the first working coil WC1 through the thermal insulation material 35.

Since the spacer shares a role of the thermal insulation material 35, the thickness of the thermal insulation material 35 can be minimized. Thus, a gap between the target object HO and the first working coil WC1 can be minimized.

In some implementations, a plurality of spacers can be provided and can be spaced apart from each other between the first working coil WC1 and the thermal insulation material 35. Accordingly, air suctioned into the case 25 by a cooling fan 55 described below can be guided to the first working coil WC1 by the spacer.

For example, the spacer can guide air, suctioned into the case 25 by the cooling fan 55, to the first working coil WC1 to improve cooling efficiency of the first working coil WC1.

The blocking plate 45 can be disposed on a lower surface of the first working coil WC1 and can block a magnetic field that is generated downward when the first working coil WC1 is driven.

For example, the blocking plate 45 can block a magnetic field that is generated downward when the first working coil WC1 is driven, and can be supported upward by the support member 50.

The support member 50 can be installed between a lower surface of the blocking plate 45 and a lower surface of the case 25 and can support the blocking plate 45 upward.

The support member 50 can indirectly support the first working coil WC1, the thermal insulation material 35, and the first heating thin film coating TL1 upward by supporting the blocking plate 45 upward. Accordingly, a gap between the first working coil WC1 and a target object HO can remain constant.

The support member 50, for example, can include an elastic object (e.g., a spring) for supporting the blocking plate 45 upward. In some implementations, the induction heating type cooktop 1 may not include the support member 50.

The cooling fan 55 can be installed in the case 25 to cool the first working coil WC1.

For example, driving of the cooling fan 55 can be controlled by the above-described control module, and the cooling fan 55 can be disposed on a lateral wall of the case 25. In some implementations, the cooling fan 55 can be disposed at another position instead of a lateral wall of the case 25. The cooling fan 55 disposed on a lateral wall of the case 25 will be described as an example for convenience of description.

The cooling fan 55, as illustrated in FIG. 2, can suction air outside the case 25 and deliver the air to the first working coil WC1, or can suction air (in particular, hot air) in the case 25 and discharge the air out of the case 25.

Thus, components (in particular, the first working coil WC1) in the case 25 can be efficiently cooled.

The air outside the case 25, delivered to the first working coil WC1 by the cooling fan 55, can be guided to the first working coil WC1 by the spacer. Accordingly, the first working coil WC1 can be cooled directly and efficiently, and durability (i.e., durability as a result of prevention of damage caused by heat) of the first working coil WC1 can improve.

The induction heating type cooktop 1 can have the above features and configurations. Referring to FIGS. 5 to 8, features and configurations of the above-described heating module will be described below.

Thickness of each component illustrated in FIGS. 5 and 6 is schematically expressed for convenience of description and does not relate to an actual scale, and a difference between relative thicknesses of the components do not relate to an actual scale.

FIGS. 5 and 6 are diagrams illustrating views for describing a relationship between thickness and skin depth of a thin film. FIGS. 7 and 8 are diagrams illustrating views for describing a change in impedance between a thin film and a target object based on a type of the target object.

The first heating thin film coating TL1 and the second heating thin film coating TL2 can have the same technical features. For convenience of description, the first heating thin film coating TL1 will be described below as an example.

The features of the first heating thin film coating TL1 are described as follows.

The first heating thin film coating TL1 can be made of a material having a low relative permeability. Types of the material are described above.

For example, the relative permeability of the first heating thin film coating TL1 can be low and the skin depth of the first heating thin film coating TL1 can be deep. The skin depth can denote a depth to which electric current permeates from a surface of a material, and the relative permeability can be inversely proportional to the skin depth. Accordingly, as the relative permeability of the first heating thin film coating TL1 becomes low, the skin depth of the first heating thin film coating TL1 can become deep.

Additionally, the skin depth of the first heating thin film coating TL1 can be greater than the thickness of the first heating thin film coating TL1. For example, since the first heating thin film coating TL1 has a small thickness and has a skin depth greater than the thickness thereof, a magnetic field generated by the first working coil WC1 can pass through the first heating thin film coating TL1 and can be delivered to the target object HO, such that eddy current is induced to the target object HO.

When the skin depth of the first heating thin film coating TL1 is less than the thickness of the first heating thin film coating TL1, as illustrated in FIG. 5, a magnetic field generated by the first working coil WC1 can hardly reach the target object HO.

When the skin depth of the first heating thin film coating TL1 is greater than the thickness of the first heating thin film coating TL1, as illustrated in FIG. 6, a magnetic field generated by the first working coil WC1 can mostly reach the target object HO. For example, since the skin depth of the first heating thin film coating TL1 is greater than the thickness of the first heating thin film coating TL1, a magnetic field generated by the first working coil WC1 can pass through the first heating thin film coating TL1 and can be mostly used by the target object HO. Thus, the target object HO can be mainly heated.

The first heating thin film coating TL1 can have a small thickness as described above. Accordingly, the first heating thin film coating TL1 can have a resistance value to the extent that the first heating thin film coating TL1 can be heated by the first working coil WC1.

The thickness of the first heating thin film coating TL1 can be inversely proportional to the resistance value (i.e., a surface resistance value) of the first heating module HM1. For example, as the thickness of the first heating thin film coating TL1 becomes small, the resistance value (i.e., a surface resistance value) of the first heating thin film coating TL1 can become high.

Since the first heating thin film coating TL1 having the above features is provided to heat a non-magnetic object, an impedance feature between the first heating thin film coating TL1 and the target object HO can vary depending on whether the target object HO disposed on the upper surface of the upper plate 15 has a magnetic or non-magnetic property.

A case in which the target object has a magnetic property is described below.

Referring to FIGS. 4 and 7, when a magnetic target object HO is placed on the upper surface of the upper plate 15 and the first working coil WC1 is driven, resistance R1 and inductance L1 of the magnetic object HO can form an equivalent circuit along with resistance R2 and inductance L2 of the first heating module HM1.

In some implementations, impedance (i.e., impedance including R1 and L1) of the magnetic target object can be less than impedance (i.e., impedance including R2 and L2) of the first heating thin film coating TL1, in the equivalent circuit.

When the above equivalent circuit is formed, magnitude of eddy current I1 supplied to the magnetic target object HO can be greater than magnitude of eddy current I2 supplied to the first thin film TL1. Accordingly, most of the eddy current can be supplied to the target object HO such that the target object heated HO is heated.

For example, when a target object HO has a magnetic property, the above equivalent circuit can be formed, and most of the eddy current can be supplied to the target object HO. Thus, the first working coil WC1 can directly heat the target object HO.

In some implementations, since some of the eddy current can be supplied to the first heating thin film coating TL1, the first heating thin film coating TL1 can be slightly heated. Accordingly, the target object HO can be indirectly and slightly heated by the first heating thin film coating TL1. However, a degree to which the target object HO is indirectly heated by the first heating thin film coating TL1 can be less meaningful than a degree to which the target object HO is directly heated by the first working coil WC1.

A case in which the target object has a non-magnetic property is described below.

Referring to FIGS. 4 and 8, when a non-magnetic target object HO is placed on the upper surface of the upper plate 15 and the first working coil WC1 is driven, impedance may not be present in the non-magnetic target object HO, and impedance may be present in the first heating thin film coating TL1. For example, resistance R and inductance L can be present only in the first heating thin film coating TL1.

Accordingly, eddy current I can be supplied only to the first heating thin film coating TL1 but not to the non-magnetic target object HO. For example, eddy current I can be supplied only to the first heating thin film coating TL1 such that the first heating thin film coating TL1 is heated.

In some implementations, when the target object HO has a non-magnetic property, eddy current I can be supplied to the first heating thin film coating TL1 to heat the first heating thin film coating TL1, and the non-magnetic target object HO can be indirectly heated by the first heating thin film coating TL1 heated by the first working coil WC1, as described above.

A protection temperature of the upper plate 15 can be preset by a manufacturer of an upper plate or a manufacturer of a cooktop. For example, a manufacturer of an upper plate may deliver information regarding a temperature-based lifespan of the upper plate to a manufacturer of a cooktop, and the manufacturer of a cooktop may calculate a lifespan of a product/the cooktop considering a length of time for which the cooktop is used and may set a protection temperature of the upper plate 15.

Further, a temperature sensor can be installed in one area of the upper plate 15, which can sense a change in temperatures of the upper plate 15 and supply information regarding the sensed temperature to the above-described control module.

As such, regardless of whether the target object HO has a magnetic or non-magnetic property, the target object HO can be heated directly and indirectly by a single heat source referred to as the first working coil WC1. For example, when the target object HO has a magnetic property, the first working coil WC1 can directly heat the target object HO, and when the target object HO has a non-magnetic property, the first heating thin film coating TL1 heated by the first working coil WC1 can indirectly heat the target object HO.

The induction heating type cooktop 1, as described above, can heat all the magnetic and non-magnetic objects. Accordingly, the induction heating type cooktop 1 can heat a target object regardless of the position and type of the target object. Thus, a user may place a target object in any heating area on the upper plate without checking whether the target object has a magnetic or non-magnetic property, and improved usability can be ensured.

Additionally, the induction heating type cooktop 1 can use the same heat source to heat a target object directly and indirectly. Accordingly, the induction heating type cooktop 1 does not require any additional heating plate or radiant heater. Thus, the induction heating type cooktop 1 can improve heating efficiency and reduce material costs.

Another exemplary induction heating type cooktop is described below.

Figure 9:
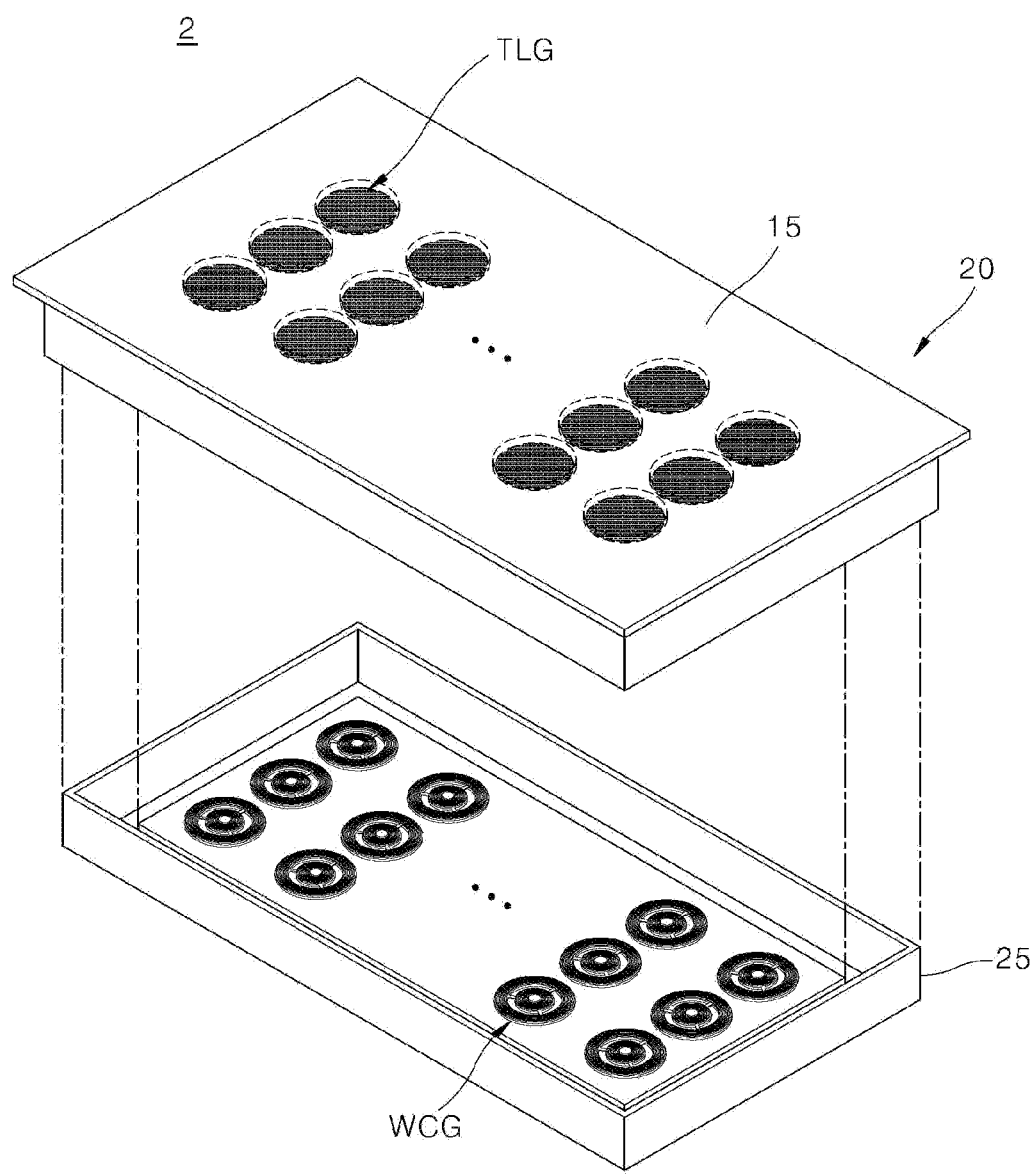
FIG. 9 is a diagram illustrating an exemplary induction heating type cooktop.
Figure 10:
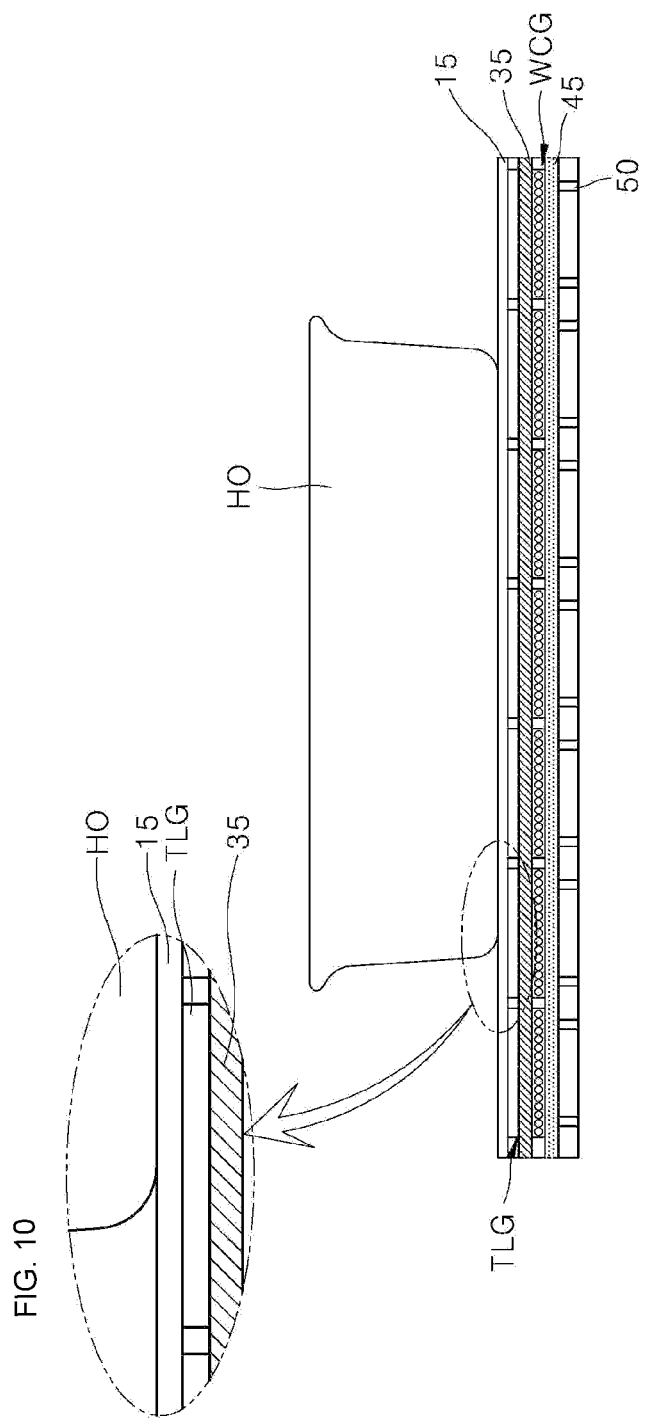
FIG. 10 is a diagram illustrating components included in the induction heating type cooktop in FIG. 9.
Figure 11:
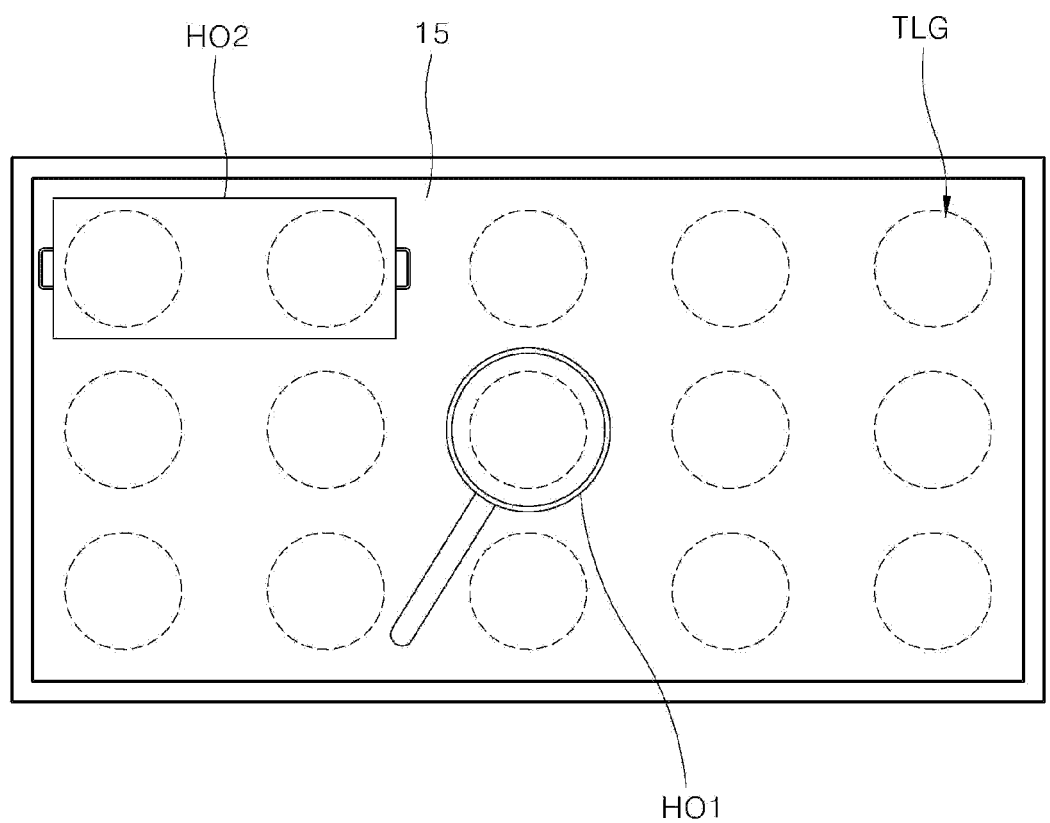
FIG. 11 is a diagram illustrating a view of a state in which target objects are placed on the induction heating type cooktop in FIG. 9.

FIG. 9 is a diagram illustrating an exemplary induction heating type cooktop 2. FIG. 10 is a diagram illustrating components included in the induction heating type cooktop 2 in FIG. 9. FIG. 11 is a diagram illustrating a state in which target objects are placed on the induction heating type cooktop 2 in FIG. 9.

The induction heating type cooktop 2 can be similar to the induction heating type cooktop 1 in FIG. 1 except for some components and effects, thus the differences will be described below.

Referring to FIGS. 9 and 10, the induction heating type cooktop 2 can be a zone free type cooktop unlike the induction heating type cooktop 1 in FIG. 1.

The induction heating type cooktop 2 can include a case 25, a cover plate 20, a plurality of heating thin film coatings TLG, a thermal insulation material 35, a plurality of working coils WCG, a blocking plate 45, a support member 50, a cooling fan, a spacer, and a control module.

The plurality of heating thin film coatings TLG can overlap the plurality of working coils WCG in the vertical direction and can be disposed to respectively correspond to the plurality of working coils WCG on a one-to-one basis.

In some implementations, the plurality of heating thin film coatings TLG can correspond to the plurality of working coils WCG on a one-to-many basis instead of a one-to-one basis. The plurality of heating thin film coatings TLG disposed to correspond to the plurality of working coils WCG on a one-to-one basis is described as an example for convenience of description.

The induction heating type cooktop 2 can be a zone free type cooktop including the plurality of heating thin film coatings TLG and the plurality of working coils WCG. Accordingly, the cooktop 2 can heat a single target object HO using some or all of the plurality of working coils WCG or some or all of the plurality of heating thin film coatings TLG at the same time. In some implementations, the cooktop 2 can heat a target object HO using some or all of the plurality of working coils WCG and some or all of the plurality of heating thin film coatings TLG.

Thus, as illustrated in FIG. 9, target objects HO1 and HO2 can be heated in an area (e.g., the upper plate 15 area) where the plurality of working coils (WCG in FIG. 8) and the plurality of heating thin film coatings TLG are provided, regardless of the positions, sizes and types of the target objects HO1 and HO2.

What is claimed is:
1. An induction heating type cooktop, comprising:
a case;
a cover plate coupled to an upper end of the case and including an upper plate arranged to receive a target object;
a working coil disposed in the case and configured to heat the target object;
a thermal insulation material disposed on the working coil; and
a heating thin film coating disposed on a surface of the upper plate of the cover plate or a surface of the thermal insulation material and having a stacked structure in which an adhesive layer and a heating layer are consecutively stacked,
wherein the heating thin film coating further comprises a protection layer stacked on a surface of the heating layer,
wherein the protection layer comprises an inorganic material, a metal oxide, or a combination of both, and
wherein a skin depth of the heating thin film coating is greater than a thickness of the heating thin film coating.
2. The induction heating type cooktop of claim 1, wherein the heating thin film coating is provided by a deposition technique including sputtering deposition, chemical vapor deposition (CVD), electron beam deposition, or combinations thereof.

3. The induction heating type cooktop of claim 2, wherein:
the heating thin film coating is deposited in a chamber having a temperature between 20 to 100° C.,
the adhesive layer is deposited at a deposition speed of 1 to 5 angstrom per second Å/s),
the heating layer is deposited at a deposition speed of 5 to 15 Å/s, and
the protection layer is deposited at a deposition speed of 1 to 5 Å/s.

4. The induction heating type cooktop of claim 2, wherein the heating thin film coating is provided by thermal processing at 100 to 900° C. for 1 to 5 hours after the deposition.

5. The induction heating type cooktop of claim 1, wherein the heating layer comprises a plurality of layers.

6. The induction heating type cooktop of claim 1, wherein the adhesive layer comprises metal, a metal oxide, or a combination of both.

7. The induction heating type cooktop of claim 1, wherein the heating layer comprises metal, a metal alloy, or a combination of both.

8. The induction heating type cooktop of claim 1, wherein the adhesive layer has a thickness between 10 nm to 3000 nm.

9. The induction heating type cooktop of claim 1, wherein the heating layer has a thickness between 0.1 μm to 50 μm.

10. The induction heating type cooktop of claim 1, wherein the protection layer has a thickness between 0.1 μm to 20 μm.

11. The induction heating type cooktop of claim 1, wherein the heating thin film coating has a resistance value, the resistance value of the heating thin film coating enabling the heating thin film coating to be heated by the working coil.

12. The induction heating type cooktop of claim 1, wherein a diameter of the heating thin film coating is shorter than a diameter of the upper plate of the cover plate.

13. The induction heating type cooktop of claim 1, wherein, based on the target object being magnetic, resistance and inductance of the target object provide an equivalent circuit with resistance and inductance of the heating thin film coating.

14. The induction heating type cooktop of claim 13, wherein impedance of the target object is less than impedance of the heating thin film coating in the equivalent circuit.

15. The induction heating type cooktop of claim 14, wherein magnitude of eddy current supplied to the target object is greater than magnitude of eddy current supplied to the heating thin film coating.

16. The induction heating type cooktop of claim 1, wherein based on the target object being non-magnetic, impedance is present in the heating thin film coating and impedance is not present in the target object.

17. The induction heating type cooktop of claim 16, wherein eddy current is supplied to the heating thin film coating, and eddy current is not supplied to the target object.

18. The induction heating type cooktop of claim 1, wherein, based on the target object being magnetic, the target object is directly heated by the working coil, and
wherein, based on the target object being non-magnetic, the target object is heated by the heating thin film coating heated by the working coil.

19. The induction heating type cooktop of claim 1, further comprising:
a blocking plate disposed at a lower surface of the working coil and configured to block a magnetic field generated downward by the working coil;
a support member disposed between a lower surface of the blocking plate and a lower surface of the case and supporting the blocking plate; and
a cooling fan disposed in the case and configured to cool the working coil.

20. The induction heating type cooktop of claim 19, wherein the support member comprises an elastic object for supporting the blocking plate upward.

21. The induction heating type cooktop of claim 19, wherein the cooling fan is configured to (i) suction air from outside of the case and deliver the suctioned air to the working coil or (ii) suction air in the case and discharge the suctioned air to outside of the case, and
wherein the thermal insulation material limits delivery of heat to the working coil.

* * * * *